United States Patent [19]

Swenson

[11] 4,033,211

[45] July 5, 1977

[54] REPLACEABLE FLINGER FOR LIVE CENTERS

[75] Inventor: Henry F. Swenson, Roseland, N.J.

[73] Assignee: J & S Tool Company, Inc., Livingston, N.J.

[22] Filed: Aug. 19, 1976

[21] Appl. No.: 715,868

[52] U.S. Cl. .................................. 82/33 R; 142/53
[51] Int. Cl.² ........................................ B23B 23/04
[58] Field of Search .............. 82/33 R, 30; 142/53; 51/238 R

[56] References Cited

UNITED STATES PATENTS

| 2,142,639 | 1/1939 | Fish | 142/53 X |
| 2,267,940 | 12/1941 | Mentley | 82/33 R |
| 2,701,978 | 2/1955 | Lee | 82/33 R |

Primary Examiner—Leonidas Vlachos
Attorney, Agent, or Firm—Ralph R. Roberts

[57] ABSTRACT

This invention pertains to a replaceable flinger for use with live centers. This flinger is placed as an auxiliary member on the hardened center. In addition to having a forward flinger adapted to withstand the abrasive action of chips, abrasive particles and the like, there is also a land portion on its rear on which the engaging lip of a grease or oil seal rides. When the center is to be reconditioned due to damage to the forward portion of the flinger or because of excessive wear to the seal engaging surface of the flinger, only the grease seal and the flinger need be replaced. This reconditioning does not require the replacement of the hardened center member.

3 Claims, 4 Drawing Figures

REPLACEABLE FLINGER FOR LIVE CENTERS

BACKGROUND OF THE INVENTION

1. Field of the Invention

With reference to the classification of art as established in the U.S. Patent and Trademark Office the present invention is found in the general Class entitled, "Turning" (class 82) and more particularly in the subclass thereunder entitled, "centers" (subclass 33).

2. Description of the Prior Art

Live centers are well known in the field of turning and in particular the use of ball bearings in live centers. When live centers are used the hardened center is free turning in bearings. As reduced to practice, these bearings are protected by a grease seal or shield. A grease seal has the lip portion in sliding contact with the movable center member and this sliding contact has a tendency to wear both the flexible lip of the seal and the hardened center member. In the case of centers as shown in prior art devices where the grease seal is not protected, the grit from grinding as carried by the flushing lubricant normally used in the turning or grinding operation has a tendency to combine with the lip of the grease seal device to increase the abrasive action on the revolving center portion. When this occurs not only does the grease seal have to be replaced but after two or three replacements the revolving center portion must also be replaced in order to provide a smooth surface or land for the lip to ride. When and where the center is a hardened ground piece of steel this replacement is usually rather expensive. On many occasions before the damage to the live center has been detected a contamination of the bearings causes excessive wear of the bearings. The present invention proposes to protect the lip of the grease seal or shield and at the same time provide a renewal surface which can be replaced when the flexible lip of the grease sheild is excessively worn.

SUMMARY OF THE INVENTION

The present invention utilizes live centers as normally constructed in which a center member is provided with a land upon which the lip of the grease seal or sheild rides as the center portion is rotated. A flinger piece is provided on this center portion and is generally of aluminum or steel. This flinger member is in the form of a U- or J-shape in which a forward upstanding angle flange protects the lip of the grease shield. An extending leg of the flinger is fastened to the revolving center providing a smooth surface for the lip of the grease seal to rest and ride upon. In the present invention a replacement of the flinger is contemplated. This replacement becomes necessary after damage by a work piece or by excessive wear of an abrasive in the coolant or the like. The removal of the center piece and the replacement of the flinger and grease shield are readily accomplished at a cost of a few dollars rather than repairing an expensive ground center piece of hardened tool steel which must be carefully fitted to the spindle bearings before and after installation.

In addition to the above summary the following disclosure is detailed to insure adequacy and aid in understanding of the invention. This disclosure, however, is not intended to cover each new inventive concept therein no matter how it may later be disquised by variations in form or additions of further improvements. For this reason there has been chosen a specific embodiment of the live center flinger as adopted for mounting on the revolving center member and showing two embodiments of seal lips. These specific embodiments have been chosen for the purposes of illustration and description as shown in the accompanying drawing wherein:

BRIEF DESCRIPTION OF THE DRAWING

In the following description and in the claims various details are identified by specific names for convenience. These names, however, are intended to be generic in their application. Corresponding reference characters refer to like members throughout the four figures of the drawing.

Figure 4:
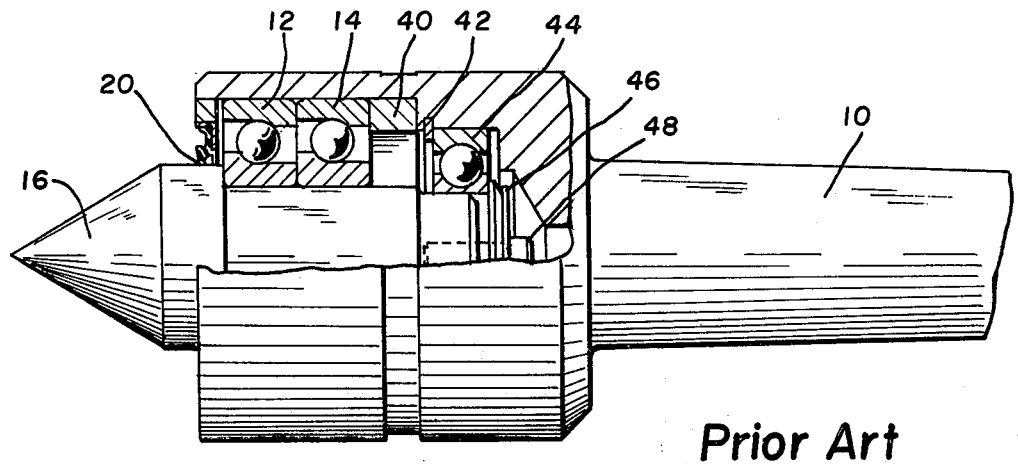
FIG. 4 represents a sectional, side view similar to FIG. 1 and showing the live center as generally constructed and labeled prior art.

The drawing accompanying this specification discloses certain details of construction for the purpose of explanation of the broader aspects of the invention, but it should be understood that structural details of the flinger may be modified in various respects with departure from the concept and principles of the invention and that the flinger may be incorporated in other structural forms than shown.

DESCRIPTION OF THE PREFERRED EMBODIMENT OF FIGS. 1 AND 2

Figure 1:
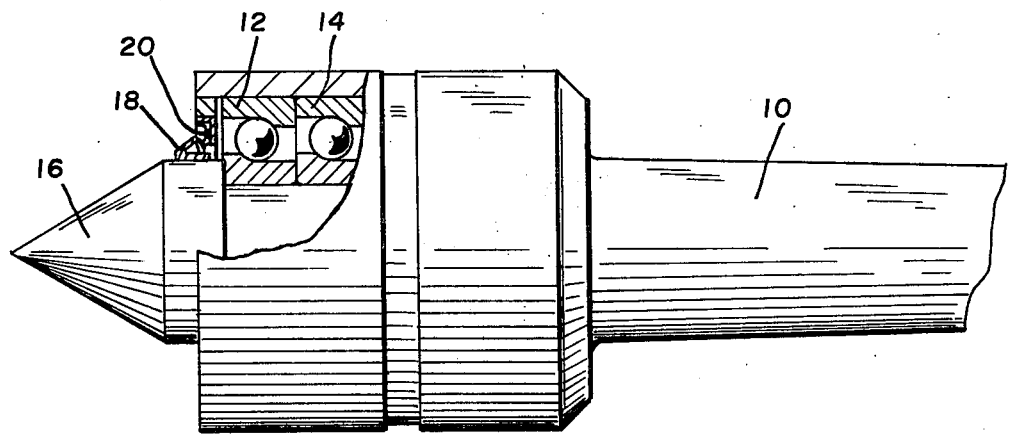
FIG. 1 represents a side view, partly in a section, of the live center of this invention and showing in particular the arrangement of the ball bearings which carry the revolving spindle portion and the flinger mounted on this spindle and the grease seal in the housing.
Figure 2:
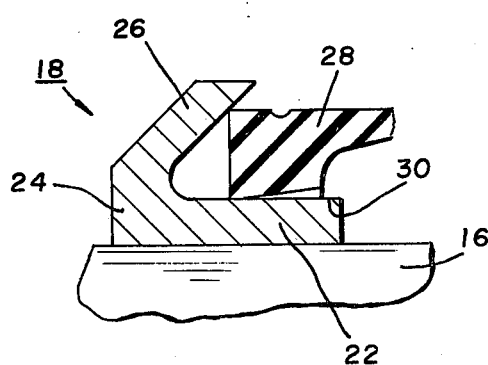
FIG. 2 represents a fragmentary, sectional side view showing the flinger of this invention as mounted upon the spindle and incorporating a protection of a lip of a grease seal as carried in the live center housing.

Referring now in particular to FIGS. 1 and 2, there is depicted an outer spindle housing 10 which is tapered at its rear end to form a standard taper for fitting in the tail stock of a lathe or grinder. The foreportion of this housing is enlarged to carry the bearings normally mounted therein. As shown in FIG. 1, there is a pair of ball bearings 12 and 14. Carried by these bearings is a front center 16 which has a 60° supporting front portion which extends to an enlarged diameter and then is reduced to the internal diameter of the bearings 12 and 14. On the larger foreportion diameter of the center 16 is mounted a flinger generally identified as 18. The area exterior of the bearings carrying this live center is closed by a grease seal of conventional construction and is identified as 20.

As particularly seen in FIG. 2, flinger 18 has a tightly engaging, generally circular and tubular portion 22 which is a tight or press fit upon the larger diameter portion of center 16. The front portion of this flinger 18 extends upwardly and outwardly at 24 and then moves approximately at a 60° angle backwardly at portion 26 so that when mounted upon the enlarged center portion 16 it is a more-or-less continuation of the front ground center angle portion. The lip 28 of the grease seal 20 is shown as engaging the exterior cylinder surface 28 while being protected by the forward flange of the flinger. This flinger prevents chips, abrasive particles or any like material from damaging the grease seal used in live centers.

ALTERNATE CONSTRUCTION AS IN FIG. 3

Figure 3:
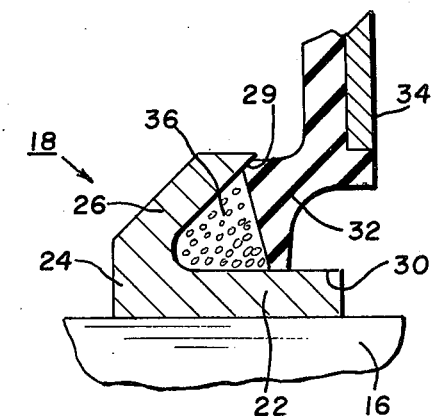
FIG. 3 represents an alternate flinger assembly showing the lip of an alternate grease seal as it engages the inside surfaces of the flinger to retain a grease portion with the flinger acting as a protector and also providing this riding surface.

Shown in the alternate construction as seen in FIG. 3, the flinger 18 is mounted upon the enlarged portion of center 16 and is a tight press fit upon this diameter. The portion 22 termiates with the forward, outwardly extending portion 24 and the rearward portion 26 is finished on its inner side to provide smooth surfaces 28 and 29. Lip portion 32 of grease seal 20 may be additionally supported by metal inside support piece 34. This lip is formed with two portions one of which engages surface 29 and the other engages the surface 28 of the flinger. Between these engaging surfaces may be carried grease in a cavity identified as 36. When grease is supplied it provides an additional lubricant and seal for the lips of the grease seal and prevents undue wear of the flinger and undue wear of the grease seal.

PRIOR ART DEVICE OF FIG. 4

In the prior art it is to be noted that a grease seal 20 and bearings 12 and 14 are carried in the interior of the spindle housing 20. The lip 20 engages the outer surface of the revolving center 16 and prevents chips, dirt or mishandling of a work piece from damaging this lip portion of the grease seal 18. A spacer 40, a snap ring 42, rear bearing 44, retaining washer 46 and screws 48, as shown, are known in the prior art but their use and arrangement is a matter of selection.

A flinger may be provided on a rotating center member of my live center by reducing the major diameter on which the lip of the grease seal rides. The flinger is made at least one-sixteenth inch thick on this skirt portion and the front face and angled flange are made to suit the live center being altered. The grease seal is replaced with the lip resting on the outer diameter of the skirt portion of this flinger. This lip is protected by the front portion of the flinger. If possible the use of heavy grease in the V-cavity formed in the flinger provides additional protection from unwanted contamination by the grinding lubricant. It also decreases the wear of the lip member. Whether used on a new or reconditioned center the flinger extends the useful life of the center and prevents accidental damage to the seal. Replacement of the flinger after wear rather than the replacing of the revolving center piece provides desirable economies.

The flinger, as reduced to practice, has been made of aluminum and anodized. Steel with appropriate rust-proofing of the surface can, of course, be used. Other commonly available material such as some plastics may also be utilized. The material selection need only provide a resonable deterrent to the entrance of chips into the flexible grease seal and a smooth surface on which the seal lip can ride without undue wear.

Terms such as "up", "down", "bottom", "top", "front", "back", "in", "out" and the like are applicable to the embodiments shown and described in conjunction with the drawing. These terms are merely for the purposes of description and do not necessarily apply to the position in which the live center flinger may be constructed or used.

While particular embodiments of the flinger and associated lips of the grease seals have been shown and described it is to be understood modifications may be made within the scope of the accompanying claims and protection is sought to the broadest extent the prior art allows.

What is claimed is:

1. In combination a replaceable flinger removably mounted on the revolving center member of a live center and a grease seal removably mounted in a fixed spindle housing and with the lip portion of the seal adapted to rest upon a land portion of the flinger as and when mounted on the revolving center member, said flinger including: (a) a metal ring-like member sized to be a press fit on the revolving center member adjacent a front bearing by which the revolving center member is carried and toward a load carrying end of the center member and providing therewith a finished outer surface substantially parallel with the axis of the live center this land portion sized to receive an engaging lip of the replaceable grease seal, said flinger having a front shoulder portion which extends outwardly beyond said outer land portion providing a protection to the lip portion of the grease seal from chips and the like, said flinger further having a rearwardly and outwardly angled portion formed to provide a recess into which the lip portion of the grease seal extends to provide further protection to the lip portion of the grease seal as the live center members support a work piece being machined, the flinger and grease seal being replaceable and replaced without further disassembly when wear of the seal lip of the finished land of the flinger occurs and leakage past this seal lip portion is potentially present.

2. A flinger combination as in claim 1 in which the surface behind the rearwardly and outwardly angled portion is also smooth finished so as to engage additionally a second outwardly formed edge portion of the lip portion of the grease seal, this flinger formed as a J-shaped cross section and with the space in the included angle interior of the J-shape filled with grease to further protect the two lip portions of the grease seal from wear and abuse.

3. A flinger as in claim 1 in which the metal flinger is of aluminum and after finishing is anodized to produce a harder surface.

* * * * *